US012756560B2

(12) United States Patent
Furukawa

(10) Patent No.: US 12,756,560 B2
(45) Date of Patent: Oct. 6, 2026

(54) INFORMATION PROCESSING DEVICE, METHOD FOR CONTROLLING INFORMATION PROCESSING DEVICE, AND NON-TRANSITORY COMPUTER READABLE MEDIUM

(71) Applicant: NEC Corporation, Tokyo (JP)

(72) Inventor: Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 18/903,163

(22) Filed: Oct. 1, 2024

(65) Prior Publication Data

US 2025/0125957 A1 Apr. 17, 2025

(30) Foreign Application Priority Data

Oct. 17, 2023 (JP) ................................. 2023-178850

(51) Int. Cl.
*H04L 9/32* (2006.01)

(52) U.S. Cl.
CPC ..................................... *H04L 9/32* (2013.01)

(58) Field of Classification Search
None
See application file for complete search history.

(56) References Cited

U.S. PATENT DOCUMENTS 6,065,008 A * 5/2000 Simon .................. G06F 40/109
707/999.009
11,281,434 B2 * 3/2022 Sandberg ............. H04L 9/0637
2008/0172562 A1 * 7/2008 Cachin ............... G06F 21/6218
711/E12.098

FOREIGN PATENT DOCUMENTS

JP H09-022381 A 1/1997

* cited by examiner

*Primary Examiner* — Farid Homayounmehr
*Assistant Examiner* — Suman Debnath
(74) *Attorney, Agent, or Firm* — Sughrue Mion, PLLC

(57) ABSTRACT

An information processing device includes an authenticated memory encryption engine configured to perform a cryptographic process and an authentication process using an authentication tree for data, and perform an authentication process for tags of respective nodes present on a path from a leaf node to which the data is assigned to a root node, in which the authenticated memory encryption engine is further configured to: update, when any of nodes in the authentication tree is to be deleted, a counter value assigned to a parent node of the node to be deleted based on a counter value assigned to the node to be deleted; and set, when a new node is to be added at a position where the deleted node was originally located in the authentication tree, a counter value assigned to the added node based on a counter value assigned to a parent node of the added node.

10 Claims, 9 Drawing Sheets

INFORMATION PROCESSING DEVICE, METHOD FOR CONTROLLING INFORMATION PROCESSING DEVICE, AND NON-TRANSITORY COMPUTER READABLE MEDIUM

INCORPORATION BY REFERENCE

This application is based upon and claims the benefit of priority from Japanese patent application No. 2023-178850, filed on Oct. 17, 2023, the disclosure of which is incorporated herein in its entirety by reference.

TECHNICAL FIELD

The present disclosure relates to an information processing device, a method for controlling an information processing device, and a non-transitory computer readable medium storing a control program.

BACKGROUND ART

A storage area of an information processing device installed in a computer or the like is divided into a plurality of layers such as a register, a cache, a memory, and a storage. It should be noted that before data is exchanged between a cache and a memory, the data is authenticated and encrypted and/or decrypted. By doing so, it is possible to prevent data stored in such an information processing device from being leaked due to a physical attack on the information processing device from the outside. Hereinafter, authentication of data and a cryptographic processing of data which are performed when the data is exchanged between a cache and a memory are also collectively referred to as an authenticated cryptographic process.

Further, in recent years, developments in regard to authentication of data using an authentication tree consisting of a plurality of nodes connected with one another in a tree shape in which a pair of a counter and an identifier is assigned to each of the nodes have been pursued. In authentication of data using an authentication tree, in addition to the data itself being authenticated, the authenticated tag of the data is also authenticated, so that the risk of leakage of the data is further reduced. A technology related to authentication of data using an authentication tree is disclosed, for example, in Patent Literature 1.

Patent Literature 1: Japanese Unexamined Patent Application Publication No. H09-022381

In the authentication of data using an authentication tree disclosed in Patent Literature 1, there is a possibility that, after any node, among a plurality of nodes constituting the authentication tree, that has become unnecessary is deleted, this deleted node can be added at the position at which the deleted node was originally located in the authentication tree again without performing any authentication process thereon. That is, in Patent Literature 1, there is a problem that data could be tampered with, so that the confidentiality thereof cannot be improved.

SUMMARY

An object of the present disclosure is to provide an information processing device, a method for controlling an information processing device, and a control program capable of solving the above-described problem.

An information processing device according to an aspect of the present disclosure includes: a memory; an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes; a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, in which the authenticated memory encryption engine is further configured to: update, when any of the plurality of nodes constituting the authentication tree is to be deleted, a value of a counter assigned to a parent node of the node to be deleted based on a value of a counter assigned to the node to be deleted; and set, when a new node is to be added at a position where the deleted node was originally located in the authentication tree, a value of a counter assigned to the added node based on a value of a counter assigned to a parent node of the added node.

A method for controlling an information processing device according to an aspect of the present disclosure is a method for controlling an information processing device, the information processing device including: a memory; an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes; a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, the method including: updating, when any of the plurality of nodes constituting the authentication tree is to be deleted, a value of a counter assigned to a parent node of the node to be deleted based on a value of a counter assigned to the node to be deleted; and setting, when a new node is to be added at a position where the deleted node was originally located in the authentication tree, a value of a counter assigned to the added node based on a value of a counter assigned to a parent node of the added node.

A control program according to an aspect of the present disclosure is a control program for causing a computer to perform a process for controlling an information processing device, the information processing device including: a memory; an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes; a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, the control program being configured to further cause the computer to perform: a process for updating, when any of the plurality of nodes constituting the authentication tree is to be deleted, a value of a counter assigned to a parent node of the node to be deleted based on a value of a counter assigned to the node to be deleted; and a process for setting, when a new node is to be added at a position where the deleted node was originally located in the authentication tree, a value of a counter assigned to the added node based on a value of a counter assigned to a parent node of the added node.

BRIEF DESCRIPTION OF DRAWINGS

The above and other aspects, features and advantages of the present disclosure will become more apparent from the following description of certain exemplary example embodiments when taken in conjunction with the accompanying drawings, in which.

EXAMPLE EMBODIMENT

First Example Embodiment

Figure 1:
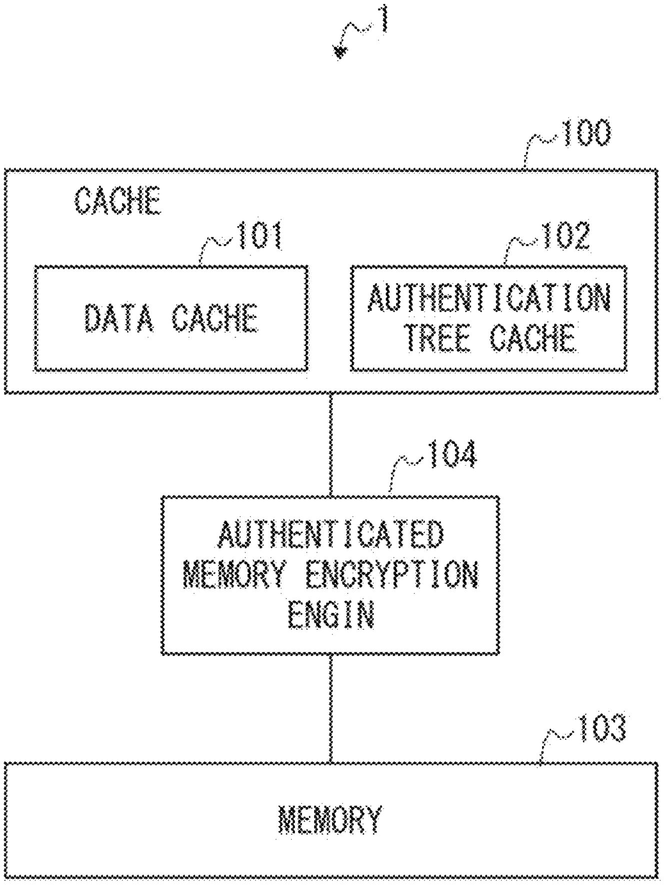
FIG. 1 is a block diagram showing an example of a configuration of an information processing device according to the present disclosure.

FIG. 1 is a block diagram showing an example of a configuration of an information processing device 1 according to the present disclosure. As shown in FIG. 1, the information processing device 1 includes a cache 100, a memory 103, and an authenticated memory encryption engine (AMEE; Authenticated Memory Encryption Engine) 104. The cache 100 is composed of a data cache 101 and an authentication tree cache 102. Hereinafter, the authenticated memory encryption engine 104 will be referred to as an AMEE 104.

The AMEE 104 performs, for data to be exchanged between the cache 100 and the memory 103, a cryptographic process (encryption and/or decryption) and an authentication process using an authentication tree consisting of a plurality of nodes connected with one another in a tree shape in which a pair of a counter and an identifier is assigned to each of the nodes. Note that in the authentication process using the authentication tree, not only a verification for data assigned to a leaf node, which is a node in the lowest layer, among a plurality of nodes constituting the authentication tree is performed, but also verifications for authenticators (tags) respectively assigned to all nodes present on a path from this leaf node to the root node are performed. By doing so, the risk of leakage of data is reduced. Note that a tag assigned to each node is generated by using a counter and an identifier assigned to that node.

In the data cache 101, data written to the memory 103 from the outside and data read from the memory 103 to the outside are temporarily stored. In the authentication tree cache 102, some of counters and identifiers assigned to respective nodes in the authentication tree, and some of tags generated by using these counters and identifiers, are temporarily stored.

Figure 2:
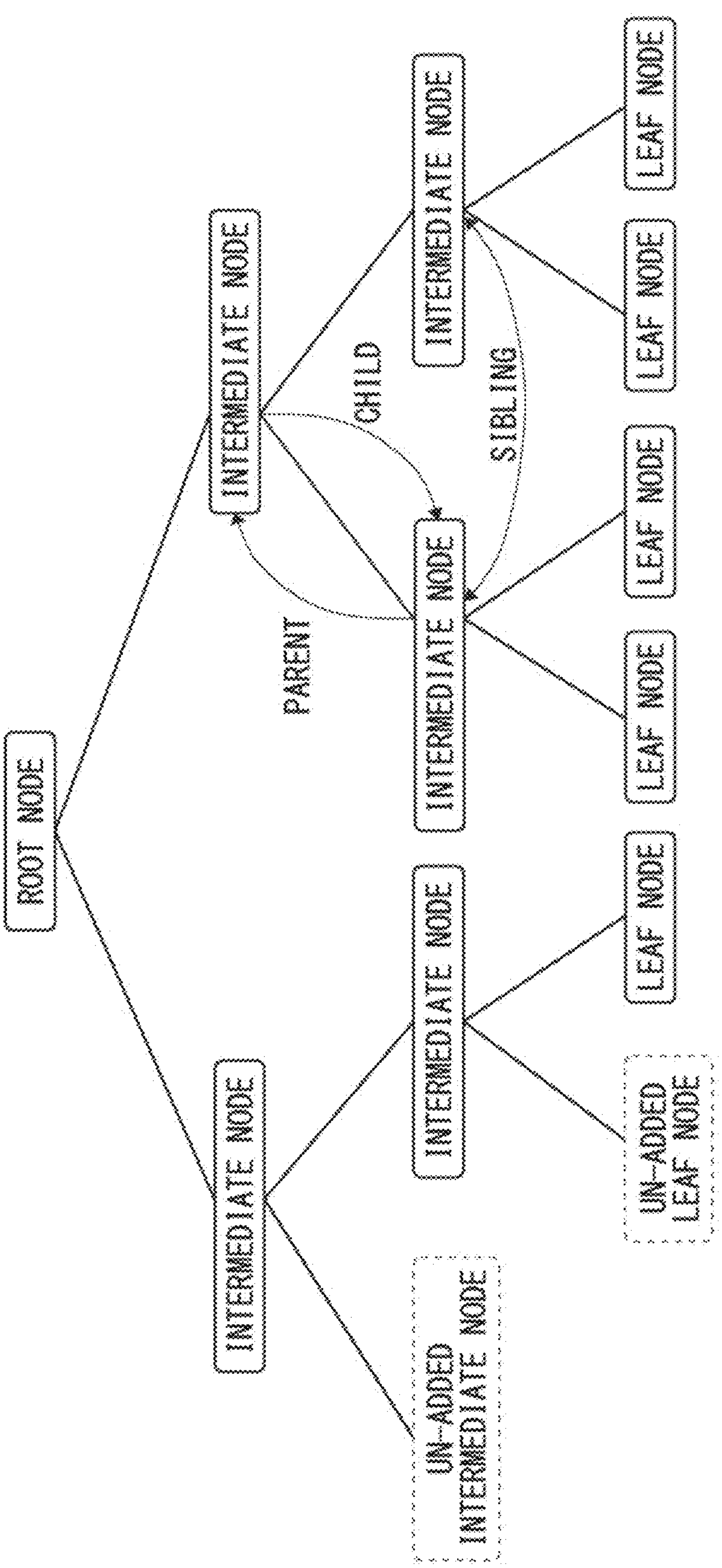
FIG. 2 is a conceptual diagram of an authentication tree.

FIG. 2 is a conceptual diagram of an authentication tree. An address space covered by this authentication tree is what should be authenticated. In other words, a plurality of address spaces respectively assigned to a plurality of leaf nodes, which are nodes in the lowest layer, among a plurality of nodes constituting the authentication tree, are what should be authenticated.

Figure 3:
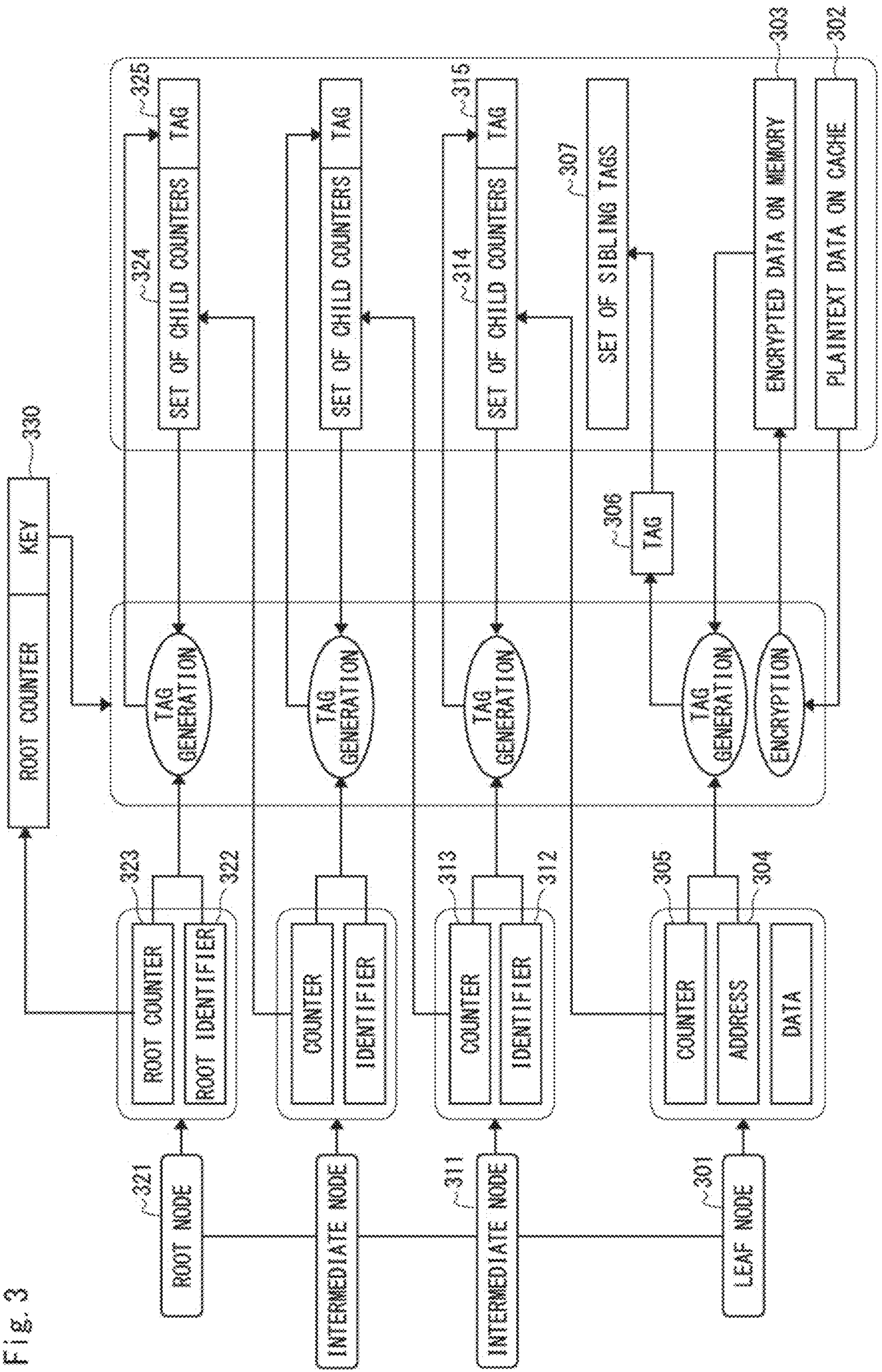
FIG. 3 shows relationships between nodes constituting the authentication tree and cache lines corresponding thereto.

FIG. 3 shows relationships between nodes constituting the authentication tree and cache lines corresponding thereto.

A data block is assigned to each node. A unit data block assigned to each node is called a cache line. Note that it is assumed that each cache line is provided with at least a bit that indicates either “dirty” or “clean”. Note that “clean” indicates that a cache line stored in the cache 100 is the same as a corresponding cache line stored in the memory 103. Further, “dirty” indicates that a cache line stored in the cache 100 has been updated and is different from a corresponding cache line stored in the memory 103.

Further, a counter and an identifier are assigned to each node. The identifier of each leaf node (node in the lowest layer) is an address of a cache line corresponding thereto. The identifier of each intermediate node can be derived from its position in the authentication tree. For example, an identifier assigned to the parent node of a leaf node specified by a given address can be derived from the address of this leaf node.

Further, data corresponding to the address (identifier) is assigned to each leaf node. When this data is written to the data cache 101, the data coincides with a cache line that is written to the data cache 101. The cache line that is written to the data cache 101 contains only data.

At a given leaf node 301, encrypted data (hereinafter, also referred to simply as ciphertext) 303 is generated by plaintext data 302 of a cache line corresponding thereto and a key 330, and a tag (authenticator, MAC) 306 is generated by the ciphertext 303, the address 304 of the leaf node 301, the value of a counter 305 of the leaf node 301, and the key 330. Note that the tag 306 generated at the leaf node 301 is stored in a cache line 307 different from the cache line of the plaintext data 302, together with a tag generated at another node (sibling node) of which the parent node is the same as that of the leaf node 301.

When the cache line assigned to the leaf node 301 is written from the data cache 101 to the memory 103, instead of the plaintext data 302, the ciphertext 303 generated by encrypting the plaintext data 302 is written to the memory 103.

In contrast, when the cache line assigned to the leaf node 301 is read from the memory 103 into the data cache 101, firstly, a tag is generated by the address 304 of the leaf node 301, the value of the counter 305 of the leaf node 301, the ciphertext 303 read from the memory 103, and the key 330. Then, only when the generated tag matches the tag 306 stored in the cache line 307, the ciphertext 303 read from the memory 103 is decrypted into plaintext data 302 by the key 330, and then the decrypted plaintext data 302 is read into the data cache 101 as the cache line of the leaf node 301. Note that in this process, the value of the counter 305 of the leaf node 301 needs to be included in the cache line of its parent node (intermediate node 311) and needs to be present in the authentication tree cache 102.

At a given intermediate node 311, a tag 315 is generated by values of the respective counters 314 of all the child nodes of the intermediate node 311, the value of the counter 313 of the intermediate node 311, the identifier 312 of the intermediate node 311, and the key 330. The cache line assigned to the intermediate node 311 is composed of values of the respective counters 314 of all the child nodes of the intermediate node 311 and the tags 315 generated at the intermediate node 311.

When the cache line assigned to the intermediate node 311 is written from the authentication tree cache 102 to the memory 103, the tag included in this cache line needs to be one that has been generated by using the values of the respective counters of all the child nodes included in the cache line. In other words, after the tag included in the cache line is generated, the value of the counter of any of the child nodes included in the cache line must not be updated.

In contrast, when the cache line assigned to the intermediate node 311 is read from the memory 103 into the authentication tree cache 102, a tag is generated by the values of the respective counters 314 of all the child nodes of the intermediate node 311 included in the cache line read from the memory 103, the value of the counter 313 of the intermediate node 311, the identifier 312 of the intermediate node 311, and the keys 330. Then, only when the generated tag matches the tag included in the cache line assigned to the intermediate node 311, the cache line read from the memory 103 is read into the authentication tree cache 102. Note that in this process, the value of the counter 313 of the intermediate node 311 needs to be included in the cache line of its parent node and needs to be present in the authentication tree cache 102.

At the root node (node in the highest layer) 321, a tag 325 is generated by the values of the respective counters 324 of all the child nodes of the root node 321, the value of the counter (root counter) 323 of the root node 321, the identifier 322 of the root node 321, and the key 330. The cache line assigned to the root node 321 is composed of the values of the respective counters 324 of all the child nodes of the root node 321 and the tags 325 generated at the root node 321.

The value of a counter assigned to a given node is updated in the following cases. When a cache line assigned to a given node is written from the cache 100 to the memory 103, and this cache line has been updated after the cache line was read from the memory 103 into the cache 100, the tag included in the cache line assigned to this node is updated after the value of the counter assigned to the node is updated. After that, the updated cache line is written from the cache 100 into the memory 103.

When data (cache line) assigned to a given leaf node is updated, in principle, the values of the respective counters of all the nodes present on the path from this leaf node to the root node are counted up. Note that the counter assigned to the root node is specially protected so as not to be directly manipulated by an attacker. Further, the tag of the corresponding node is updated by the counter of the root node, the counter of each intermediate node, or the counter and data of each leaf node. In this way, the tag of each node follows the latest status.

Note that the counter assigned to each node in the authentication tree may be formed of a major counter of which the value is represented by, among a plurality of bits representing the value of the counter, a high-order bit(s), and a minor counter of which the value is represented by a low-order bit(s) thereof. In this case, the major counter assigned to a given node is shared (i.e., is also used) by other nodes of which the parent nodes are the same as that of the given node (i.e., by sibling nodes). In this way, an increase in the scale of the counter is prevented or reduced. Further, in the cache line of a give intermediate node, as the value of the counter, the values of a plurality of minor counters respectively assigned to all the child nodes of this intermediate node and the value of one major counter shared (i.e., commonly used) by all the child nodes of the intermediate node are stored. Hereinafter, a counter formed of a major counter and a minor counter is also referred to as a split counter.

When the counter assigned to each node is a split counter, the value of the major counter is updated after the value of the minor counter is updated or the value of the minor counter is initialized. When the major counter has been updated, the values of the minor counters respectively assigned to all the nodes which share (i.e., commonly use) the major counter are initialized.

Note that the scale of the authentication tree is preferably optimized by deleting an unnecessary node(s) among a plurality of nodes constituting the authentication tree, and/or adding a node(s) that has become necessary. In this way, for example, a tag(s) (authenticator(s)) related to an unused address space is deleted, so that the oppression on the storage area of the memory, which is caused by the authentication tree, is reduced. In particular, when the addresses of the memory are virtual ones, the address space to be authenticated becomes extremely larger than the actual memory size in some cases, so the optimization of the scale of the authentication tree is effective.

Therefore, when the AMEE 104 deletes any of the plurality of nodes constituting the authentication tree, it updates the value of the counter assigned to the parent node of the node to be deleted based on the value of the counter assigned to the node to be deleted. Further, when the AMEE 104 adds, to the plurality of nodes constituting the authentication tree, a new node at the position where the deleted node was originally located, it sets the value of the counter assigned to the added node based on the value of the counter assigned to the parent node of the added node.

Specifically, when the AMEE 104 deletes any of the plurality of nodes constituting the authentication tree, it updates the value of the counter assigned to the parent node of the node to be deleted to a value larger than a larger one of the value of the counter assigned to the parent node of the node to be deleted and the value of the counter assigned to the node to be deleted. Then, when the AMEE 104 adds a new node at the position where the deleted node was originally located in the authentication tree, it sets the value of the counter assigned to the added node to a value equal to or larger than the value of the counter assigned to the parent node of the added node.

Figure 4:
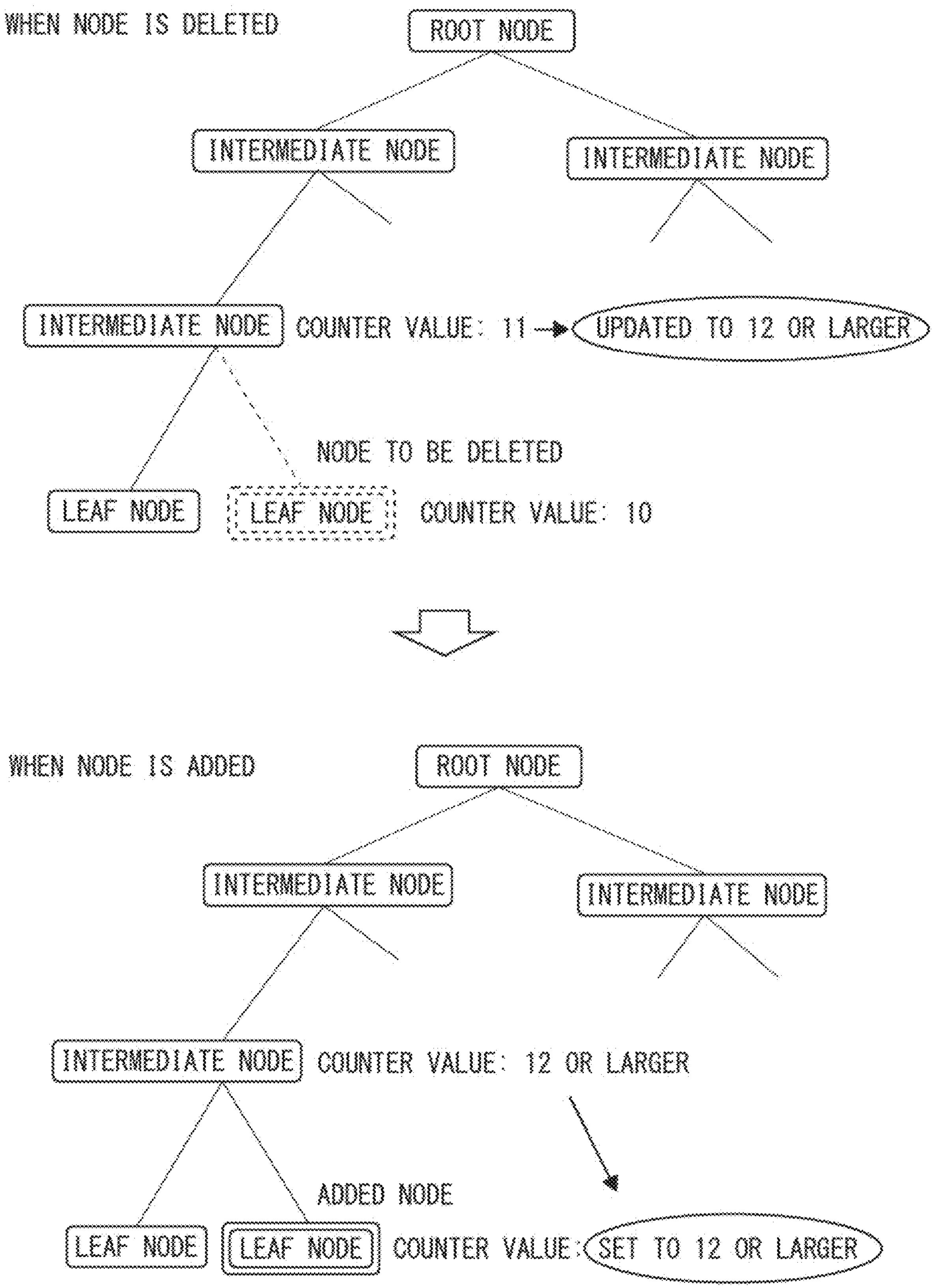
FIG. 4 is a diagram for explaining a first example of a flow for deleting and adding nodes in the authentication tree.

FIG. 4 is a diagram for explaining a first example of a flow for deleting and adding nodes in the authentication tree. For example, when the value of the counter assigned to the node to be deleted indicates "10" and the value of the counter assigned to the parent node of the node to be deleted indicates "11", the AMEE 104 updates the value of the counter "11" assigned to the parent node of the node to be deleted to, for example, "12" or larger. After that, when the AMEE 104 adds a new node at the position where the deleted node was originally located in the authentication tree, it sets the value of the counter assigned to the added node to the value of the counter of its parent node or larger, i.e., sets to "12" or larger. As a result, the counter value of the node to be deleted indicates "10", and the counter value of the added node indicates "12" or larger. That is, the counter of the node to be deleted and the counter of the added node indicate values different from each other.

Figure 5:
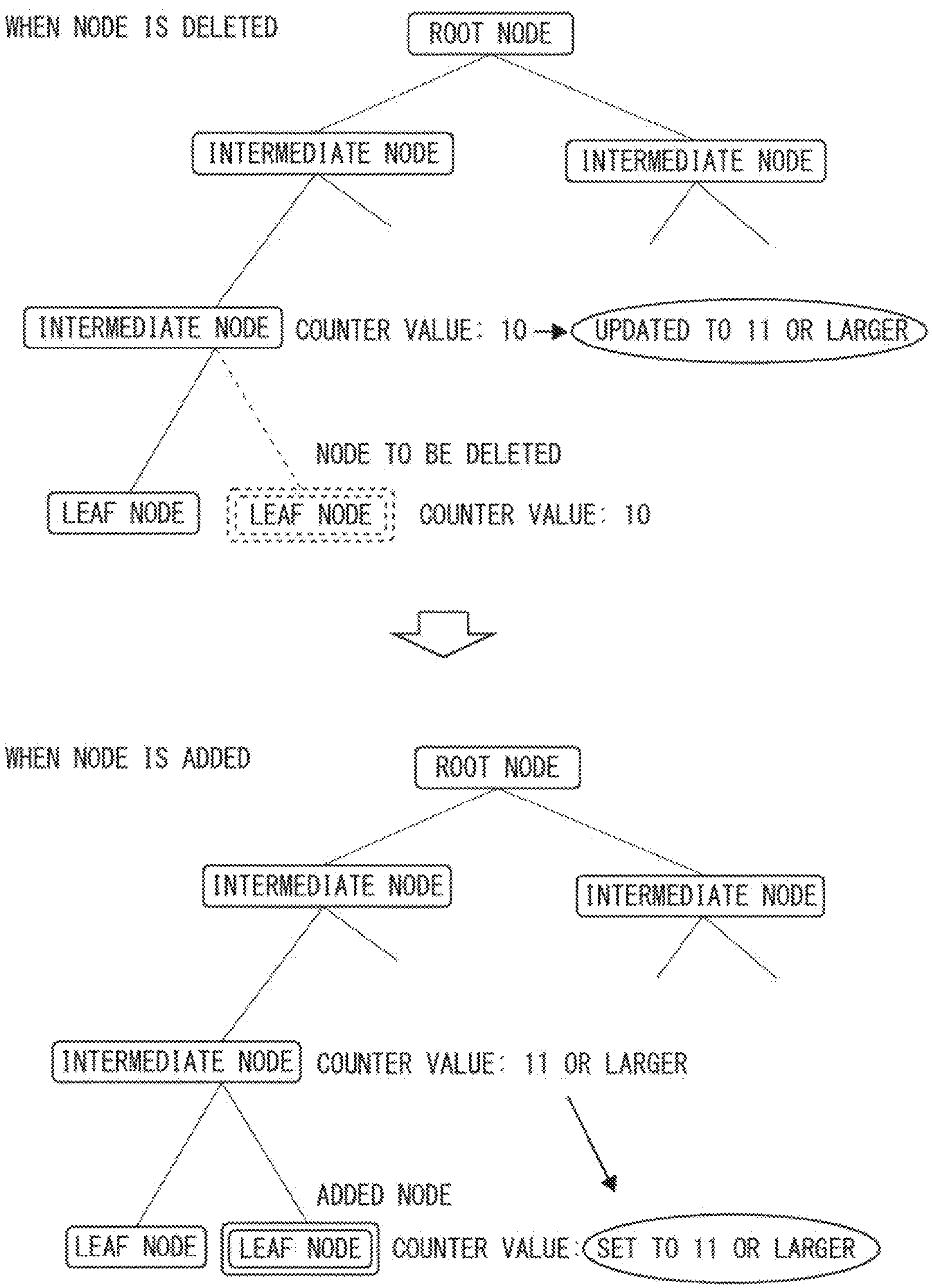
FIG. 5 is a diagram for explaining a second example of a flow for deleting and adding nodes in the authentication tree.

FIG. 5 is a diagram for explaining a second example of a flow for deleting and adding nodes in the authentication tree. For example, when the value of the counter assigned to the node to be deleted indicates "10" and the value of the counter assigned to the parent node of the node to be deleted indicates "10", the AMEE 104 updates the value of the counter "10" assigned to the parent node of the node to be deleted to, for example, "11" or larger. After that, when the AMEE 104 adds a new node at the position where the deleted node was originally located in the authentication tree, it sets the value of the counter assigned to the added node to the value of the counter of its parent node or larger, i.e., sets to "11" or larger. As a result, the counter value of the node to be deleted indicates "10", and the counter value of the added node indicates "11" or larger. That is, the counter of the node to be deleted and the counter of the added node indicate values different from each other.

Figure 6:
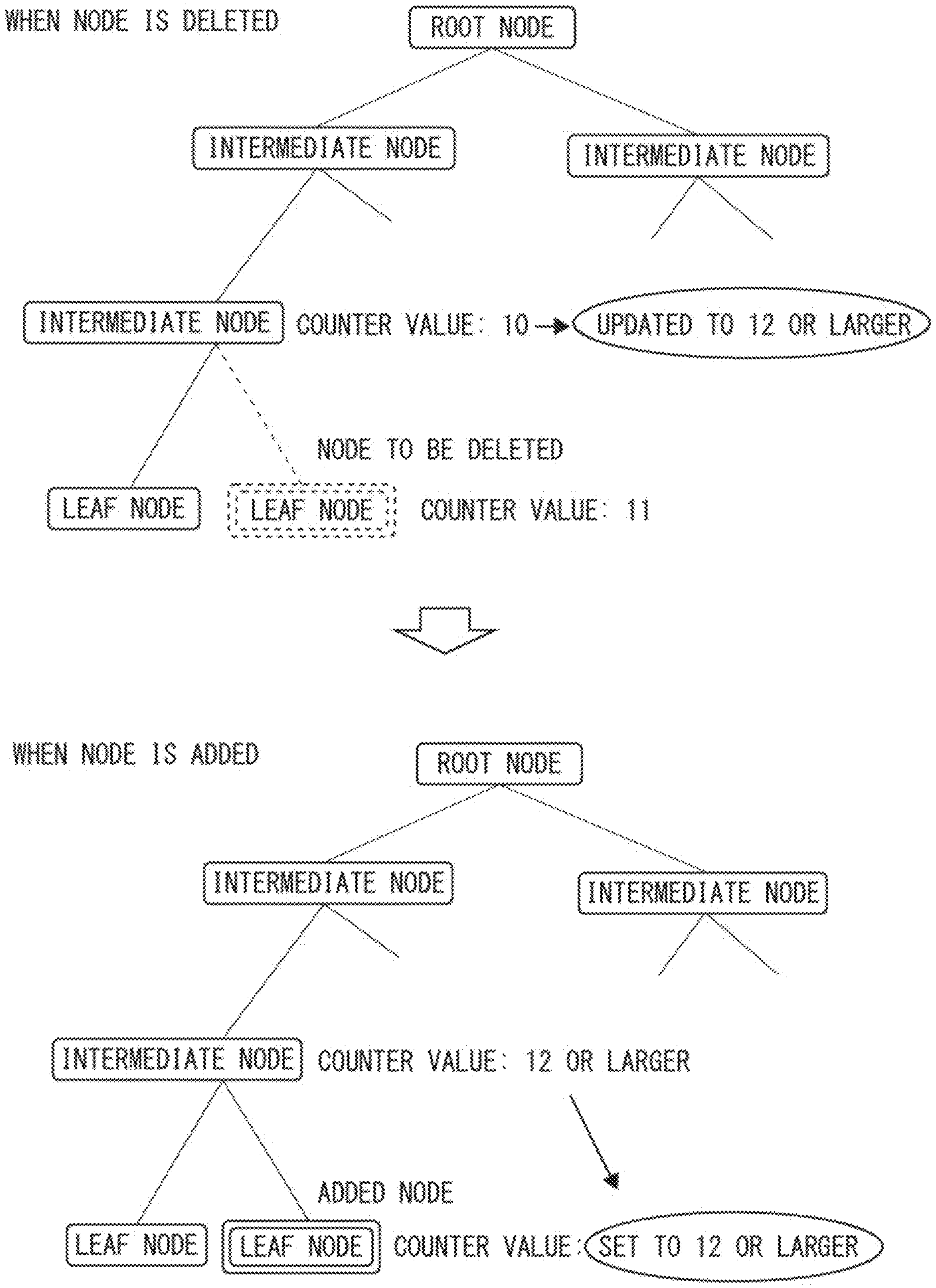
FIG. 6 is a diagram for explaining a third example of a flow for deleting and adding nodes in the authentication tree.

FIG. 6 is a diagram for explaining a third example of a flow for deleting and adding nodes in the authentication tree. For example, when the value of the counter assigned to the node to be deleted indicates "11" and the value of the counter assigned to the parent node of the node to be deleted indicates "10", the AMEE 104 updates the value of the counter "10" assigned to the parent node of the node to be deleted to, for example, "12" or larger. After that, when the AMEE 104 adds a new node at the position where the deleted node was originally located in the authentication tree, it sets the value of the counter assigned to the added node to the value of the counter of its parent node or larger, i.e., sets to "12" or larger. As a result, the counter value of the node to be deleted indicates "11", and the counter value of the added node indicates "12" or larger. That is, the counter of the node to be deleted and the counter of the added node indicate values different from each other.

As a result, the counter value of the added node always becomes larger than the counter value of the node to be deleted (i.e., the counter of the node to be deleted and the counter of the added node indicate values different from each other), so that new authentication is required when the node is added. That is, in the information processing device 1, a situation in which a node deleted in the past is added in the authentication tree again without performing any authentication thereof never occurs. As a result, the information processing device 1 can improve the confidentiality.

Note that the method for updating and setting a counter performed by the AMEE 104 is not limited to the above-described method. For example, when the AMEE 104 deletes any of the plurality of nodes constituting the authentication tree, it may update the value of the counter assigned to the parent node of the node to be deleted to the same value as a larger one of the value of the counter assigned to the parent node of the node to be deleted and the value of the counter assigned to the node to be deleted. After that, when the AMEE 104 adds a new node at the position where the deleted node was originally located in the authentication tree, it sets the value of the counter assigned to the added node to a value larger than the value of the counter assigned to the parent node of the added node.

Figure 7:
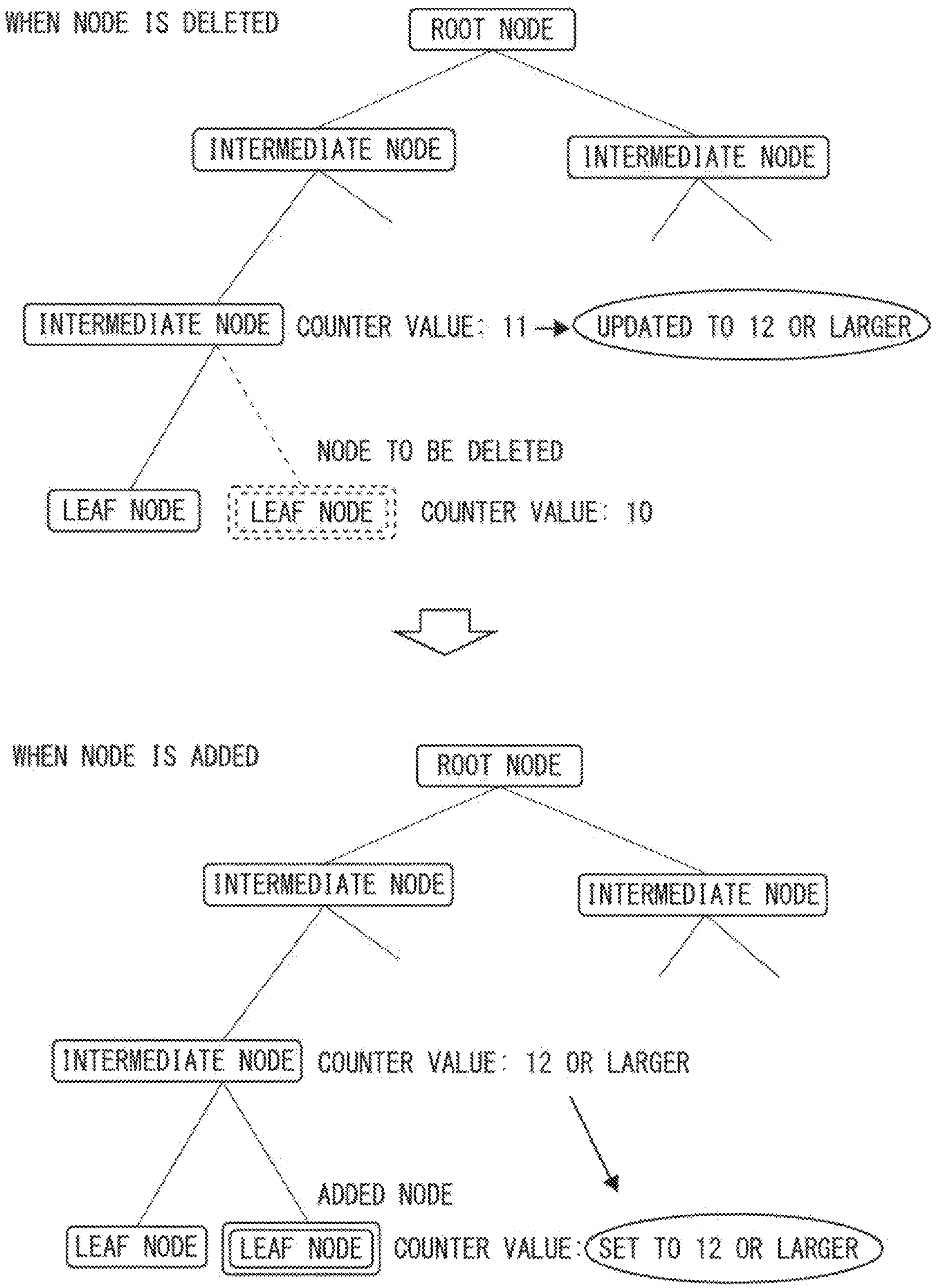
FIG. 7 is a diagram for explaining a fourth example of a flow for deleting and adding nodes in the authentication tree.
Figure 8:
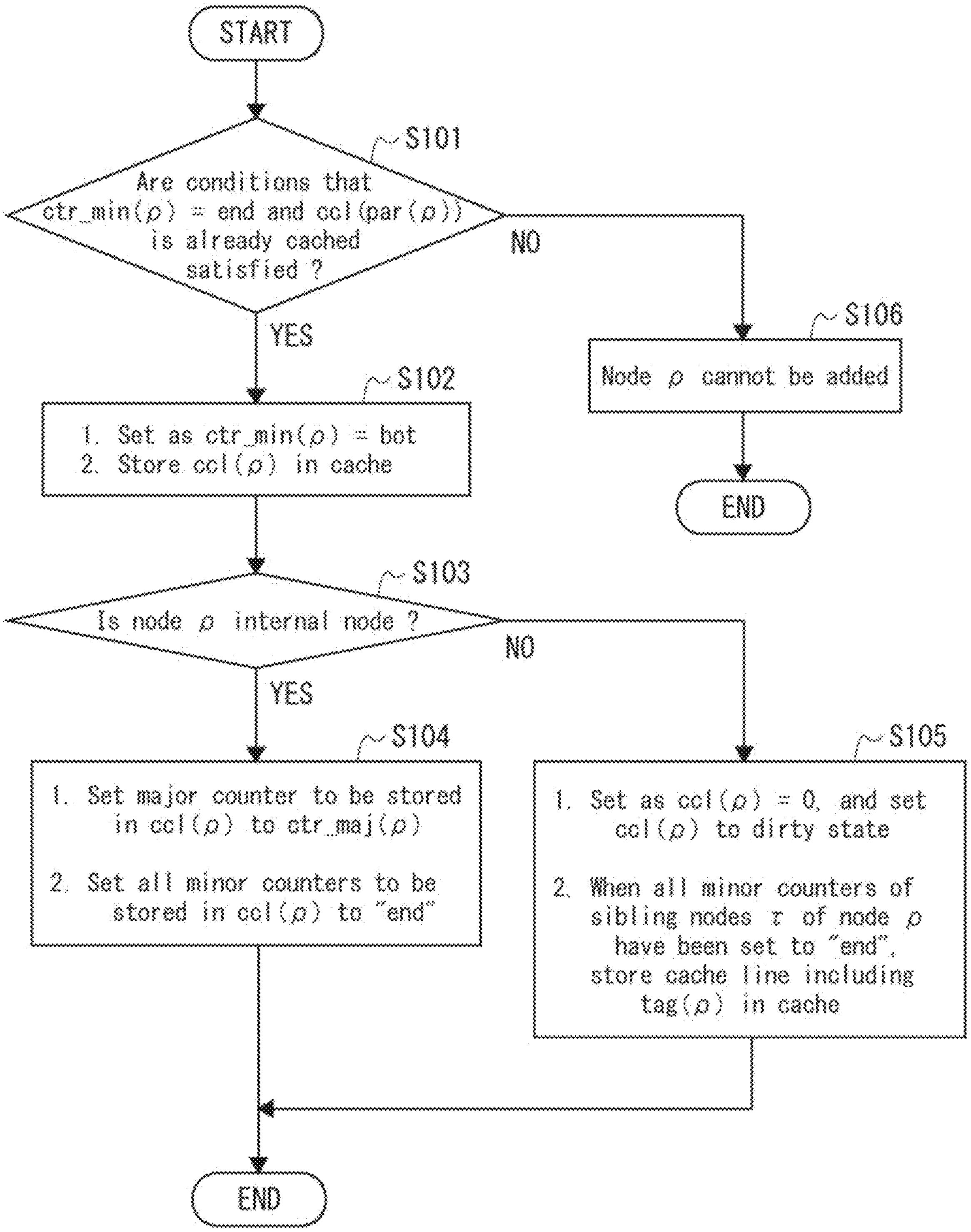
FIG. 8 is a flowchart showing a flow of processes for adding a node in the authentication tree.
Figure 9:
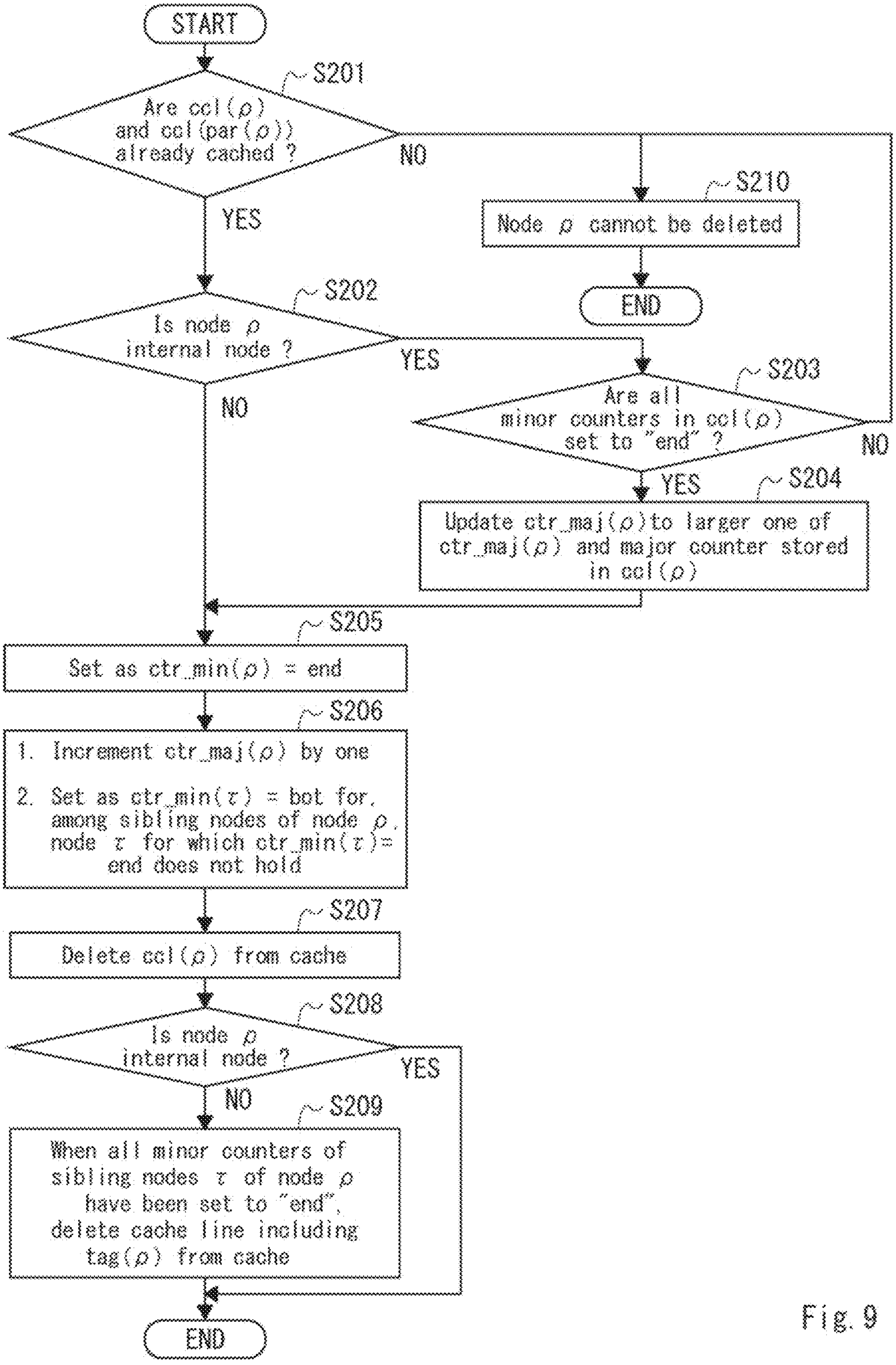
FIG. 9 is a flowchart showing a flow of processes for deleting a node in the authentication tree.

FIG. 7 is a diagram for explaining a fourth example of a flow for deleting and adding nodes in the authentication tree. For example, when the value of the counter assigned to the node to be deleted indicates "10" and the value of the counter assigned to the parent node of the node to be deleted indicates "11", the AMEE 104 updates the value of the counter "11" assigned to the parent node of the node to be deleted to, for example, "11" or larger. After that, when the AMEE 104 adds a new node at the position where the deleted node was originally located in the authentication tree, it sets the value of the counter assigned to the added node to a value larger the value of the counter of its parent node, i.e., sets to "12" or larger. As a result, the counter value of the node to be deleted indicates "10" and the counter value of the added node indicates "12" or larger.

Note that when a counter assigned to each node in the authentication tree is a split counter, the AMEE 104 performs the following processes. For example, when the AMEE 104 deletes any of the plurality of nodes constituting the authentication tree, it updates the value of the major counter assigned to the parent node of the node to be deleted may to a value larger than a larger one of the value of the major counter assigned to the parent node of the node to be deleted and the value of the major counter assigned to the node to be deleted. Then, when the AMEE 104 adds a new node at the position where the deleted node was originally located in the authentication tree, it sets the value of the major counter assigned to the added node to a value equal to or larger than the value of the major counter assigned to the parent node of the added node. Note that when the value of the major counter shared by a plurality of nodes having the common parent node has been updated, the values of the respective minor counters of the plurality of nodes having the common parent node are preferably initialized.

As described above, in the information processing device 1, when the AMEE 104 deletes any of the plurality of nodes constituting the authentication tree, it updates the value of the counter assigned to the parent node of the node to be deleted based on the value of the counter assigned to the node to be deleted. Further, when the AMEE 104 adds, to the plurality of nodes constituting the authentication tree, a new node at the position where the deleted node was originally located, it sets the value of the counter assigned to the added node based on the value of the counter assigned to the parent node of the added node. As a result, the counter value of the node to be deleted differs from the counter value of the added node, so that new authentication is required when the node is added. That is, in the information processing device 1, a situation in which a node deleted in the past is added in the authentication tree again without performing any authentication thereof never occurs. As a result, the information processing device 1 can improve the confidentiality.

For example, a virtual machine is provided to a customer in a cloud service. A virtual memory is provided in the virtual machine. An address space larger than that of a real memory is allocated in this virtual memory. The information processing device 1 according to the present disclosure can, when it is applied to such a service, optimize the size of the authentication tree and thereby reduce the used area in the storage area of the memory, and thereby improve the confidentiality.

Further, high confidentiality is required for the management of a computer that handles financial information, computer security information, military information, health information, insurance information, or safety information. The information processing device 1 according to the present disclosure can, when it is applied to such management of a computer, optimize the size of the authentication tree and thereby reduce the used area in the storage area of the memory, and thereby improve the confidentiality.

Further, by including instructions for deleting and adding a node in an instruction set, it is possible to apply the information processing device 1 according to the present disclosure to a chip set including a CPU.

Second Example Embodiment

A more detailed flow of processes performed by the information processing device 1 will be described hereinafter.

In the following description, in a parallelizable authentication tree (PAT), ρ represents a node; ccl(ρ) represents a cache line assigned to the node ρ; par(ρ) represents a parent node of the node ρ; and Cρ represents a set of already-registered nodes among child nodes of the node ρ. The node ρ is either an internal node or a leaf node. When the node ρ is an internal node, a cache line including values of respective counters of all the child nodes of the node ρ, and a tag generated at the node ρ are assigned to the node ρ. When the node ρ is a leaf node, a cache line including memory data is assigned to the node ρ. Further, when the node ρ is a leaf node, a cache line including the tag of the node ρ and respective tags of other nodes of which the parent nodes are same as that of the node ρ are further assigned to the node ρ.

A counter ctr(ρ) is assigned to a given internal node ρ. Since a counter and an identifier are used as a nonce of a cryptographic function for generating a tag (authenticator), they need to be updated when the authentication tree is updated (including when it is updated to return to the same memory state) in order to resist a replay attack.

In the present disclosure, an example in which the counter ctr(ρ) is a split counter formed of a major counter ctr_maj(ρ) and a minor counter ctr_min(ρ) will be described. While the major counter ctr_maj(ρ) is shared (i.e., commonly used) by sibling nodes of the node ρ, the minor counter ctr_min(ρ) is uniquely assigned to the node ρ. In the cache line of the internal node ρ, a major counter ctr_maj(τ) shared by all the child nodes τ of the node ρ (where τ∈Cρ), minor counters ctr_min(τ) assigned to the respective child nodes τ of the node ρ, and a tag tag(ρ) generated at the node ρ are stored.

The minor counter circulates (i.e., completes a full cycle) more frequently than the major counter. Therefore, some special meanings are defined by some of the bits of the minor counter. Specifically, in the minor counter, un-registration (non-existence) of a node, the minimum value of the minor counter, and the maximum value of the minor counter are defined by some of the bits. Hereinafter, un-registration of a node is indicated by "end"; the minimum value of a minor counter is resented by "bot"; and the maximum value of a minor counter is represented by "top".

When a node ρ is not registered, the minor counter ctr_min(ρ) of the node ρ indicates "end". After that, when the counter ctr(ρ) of the node ρ is assigned to the authentication tree cache 102, i.e., when the node ρ is added, the minor counter ctr_min(ρ) of the node ρ is set to "bot". After that, each time the cache line ccl(ρ) is updated, the minor counter ctr_min(ρ) is incremented by one. Further, before the minor counter ctr_min(ρ) reaches "top", a Caryy Up(ρ) process, which is a carry-up process for the counter, is performed, so that the minor counter ctr_min(ρ) returns to "bot". In this process, the value of the major counter ctr_maj(ρ) is incremented by one.

Note that when the node ρ does not have any child node or the like, the node ρ can be deleted (pruned). As a Prune(ρ) process, which is a process for deleting the node ρ, is performed, the minor counter ctr_min(ρ) is set to "end". The size of the authentication tree dynamically changes as nodes are added and deleted. The root counter never leaves the authentication tree cache 102.

When the node ρ is an internal node, the tag tag(ρ) generated at the node ρ is included in the cache line ccl(ρ). However, as long as the parent node par(ρ) of the node ρ is cached, any of operations does not require ancestor nodes higher than the parent node par(ρ).

Hardware Configuration

The information processing device 1 includes, as hardware, the cache 100, the memory 103, and the AMEE 104. The cache 100 is composed of the data cache 101 and the authentication tree cache 102. In the data cache 101, among data, counters, and tags, only cache lines of data are cached. Therefore, the processor can access only the data cache 101 and cannot access the authentication tree cache 102. In contrast, the AMEE 104 can access any of the data cache 101, the authentication tree cache 102, and the memory 103.

Definition of Processing by AMEE 104

Firstly, a generating process Tag for generating a tag tag(ρ) assigned to an internal node ρ, performed by the AMEE 104 will be described. When sk represents a private key (key 330); ρ represents an identifier of an internal node ρ; ccl'(ρ) represents a part of a cache line ccl(ρ) of the internal node ρ other than the tag; ctr(ρ) represents a value of a counter of the internal node ρ; and tag(ρ) represents a tag generated at the internal node ρ, the generating process Tag for the tag tag(ρ) assigned to the internal node ρ, performed by the AMEE 104 is expressed as follows.

$$\mathrm{Tag}(sk, \rho, ccl'(\rho), ctr(\rho)) \rightarrow tag(\rho)$$

This indicates that the tag tag(ρ) assigned to the internal node ρ is generated by the private key sk, the identifier of the internal node ρ, the cache line ccl'(ρ), and the counter ctr(ρ).

Next, a generating process AuthEnc for generating a tag tag(ρ) assigned to a leaf node ρ and a cache line cpt(ρ) of a ciphertext, performed by the AMEE 104 will be described. When sk represents a private key; ρ represents an identifier (address) of a leaf node ρ; ccl(ρ) represents a cache line of plaintext data; ctr(ρ) represents a value of a counter of the leaf node ρ; tag(ρ) represents a tag generated at the leaf node ρ; and cpt(ρ) represents a cache line of a ciphertext, the generating process AuthEnc for generating the tag tag(ρ) assigned to the leaf node ρ and the cache line cpt(ρ) of the ciphertext, performed by the AMEE 104 is expressed as follows.

$$\mathrm{AuthEnc}(sk, \rho, ccl(\rho), ctr(\rho)) \rightarrow \{tag(\rho), cpt(\rho)\}$$

This indicates that the tag tag(ρ) assigned to the leaf node ρ and the cache line cpt(ρ) of the ciphertext are generated by the private key sk, the identifier of the leaf node ρ, the cache line ccl (ρ) of the plaintext data, and the counter ctr(ρ).

Next, an authenticating process VeriDec for authenticating a cache line cpt(ρ) of a ciphertext assigned to a leaf node ρ, performed by the AMEE 104 will be described. When sk represents a private key; ρ represents an identifier (address) of a leaf node ρ; cpt(ρ) represents a cache line of a ciphertext; ctr(ρ) represents a value of a counter of the leaf node ρ; tag(ρ) represents a tag assigned to at the leaf node ρ; and ccl(ρ) represents a cache line of plaintext data, the authenticating process VeriDec for authenticating the cache line cpt(ρ) of the ciphertext assigned to the leaf node ρ, performed by the AMEE 104 is expressed as follows.

VeriDec(sk, ρ, cpt(ρ), ctr(ρ), tag(ρ))→ccl(ρ)/"bot"

This indicates that the cache line cpt(ρ) of the ciphertext is verified by the private key sk, the identifier of the leaf node ρ, the counter ctr(ρ), and the tag tag(ρ). Further, when the authentication succeeds, the cache line ccl(ρ) of the plaintext data is generated, whereas when the authentication fails, the counter ctr(ρ) is set to "bot".

Initialization of Authentication Tree

Firstly, the initialization of the authentication tree will be described. Firstly, the AMEE 104 sets a private key sk. After that, the AMEE 104 sets the major counter ctr_maj(root) of the root node to "0" and sets the minor counter ctr_min(root) of the root node to "end".

Add(ρ) Process; Process for Adding Node ρ in Authentication Tree

Next, an Add(ρ) process performed by the AMEE 104 will be described. The Add(ρ) process is a process for adding a node ρ in the authentication tree. This process can be performed when a cache line ccl (par(ρ)) of a parent node par(ρ) of the node ρ is present in the authentication tree cache 102 and the minor counter ctr_min(ρ) of the node ρ has been set to "end" (Yes in Step S101), and is not performed in all other cases (No in Step S101) (Step S106).

When the process for adding the node ρ in the authentication tree is to be performed (Yes in Step S101), firstly, the AMEE 104 updates the minor counter ctr_min(ρ) of the node ρ from "end" to "bot", and then stores the cache line ccl(ρ) of the node ρ in the authentication tree cache 102 (Step S102).

For example, when the node ρ is an internal node (Yes in Step S103), the AMEE 104 sets the major counter of the child node stored in the cache line ccl(ρ) of the node ρ to the same value as the value of the counter ctr_maj(ρ), and also sets the minor counters of all the child nodes stored in the cache line ccl(ρ) of the node ρ to "end" (Step S104).

On the other hand, when the node ρ is a leaf node (No in Step S103), the AMEE 104 sets the cache line ccl(ρ) of the node ρ to "0" and sets the cache line ccl(ρ) to a dirty state (Step S105). Further, when nodes τ are sibling nodes of the leaf node ρ, and the minor counters ctr_min(τ) of all the sibling nodes τ have been set to "end", the AMEE 104 stores a cache line including the tag tag(ρ) of the node ρ in the authentication tree cache 102 (Step S105).

Prune(ρ) Process; Process for Deleting Node ρ in Authentication Tree

Next, a Prune(ρ) process performed by the AMEE 104 will be described. The Prune(ρ) process is a process for deleting a node ρ from the authentication tree. This process can be performed when a cache line ccl(ρ) of the node ρ and a cache line ccl (par(ρ)) of a parent node par(ρ) of the node ρ are present in the authentication tree cache 102 (Yes in Step S201), and is not performed in all other cases (No in Step S201) (Step S210).

When the node ρ is an internal node (Yes in Step S201→Yes in Step S202), it is determined whether or not the minor counters of all the child nodes stored in the cache line ccl(ρ) of the node ρ have been set to "end" (Step S203).

For example, when any of the minor counters of a plurality of child nodes stored in the cache line ccl(ρ) of the node ρ has not been set to "end" (No in Step S203), the process for deleting the node ρ is not performed (Step S210).

On the other hand, when the minor counters of all the child nodes stored in the cache line ccl(ρ) of the node ρ have been set to "end" (Yes in Step S203), the AMEE 104 updates the value of the major counter ctr_maj(ρ) of the node ρ to a larger one of the value of the major counter ctr_maj(ρ) and the major counter of the child node stored in the cache line ccl(ρ) of the node ρ (Step S204).

After that, the AMEE 104 sets the minor counter ctr_min (ρ) of the node ρ to "end" (Step S205). After that, the AMEE 104 performs a Carry Up(par(ρ)) process, which is a carry-up process for a counter described later, (Step S206). Specifically, the AMEE 104 increments the value of the major counter ctr_maj(ρ) of the node ρ by one, and sets all the minor counters ctr_min(τ) of the nodes τ of the sibling nodes of the node ρ which have not been set to "end" to "bot" (Step S206). After that, the AMEE 104 performs an Invalidata(ρ) process, which is a process for invalidating the node ρ described later (Step S207). Specifically, the AMEE 104 deletes the cache line ccl(ρ) of the node ρ from the authentication tree cache 102 (Step S207). Then, the series of processes are finished (Yes in Step S208).

When the node ρ is a leaf node (Yes in Step S201→No in Step S202), the AMEE 104 sets the minor counter ctr_min (ρ) of the node ρ to "end" (Step S205). After that, the AMEE 104 performs a Carry Up(par(ρ)) process (Step S206). Specifically, the AMEE 104 increments the value of the major counter ctr_maj(ρ) of the node ρ by one, and sets all the minor counters ctr_min(τ) of the nodes τ of the sibling nodes of the node ρ which have not been set to "end" to "bot" (Step S206). After that, the AMEE 104 performs an Invalidata(ρ) process (Step S207). Specifically, the AMEE 104 deletes the cache line ccl(ρ) of the node ρ from the data cache 101 (Step S207).

Further, when the node ρ is a leaf node (No in Step S208), and the minor counters ctr_min(τ) of all the sibling nodes τ have been set to "end", the AMEE 104 deletes the cache line ccl(tag(ρ)) including the tag tag(ρ) of the node ρ from the authentication tree cache 102 (Step S209). Then, the series of processes are finished (Yes in Step S208).

Read(ρ) Process; Process for Reading Cache Line from Memory into Cache

Next, a Read(ρ) process performed by the AMEE 104 will be described. The Read(ρ) process is process for reading a cache line of a node ρ from the memory 103 into the cache 100. This process can be performed when a cache line ccl(ρ) of the node ρ is not present in either the data cache 101 or the authentication tree cache 102, and a cache line ccl (par(ρ)) of the parent node par(ρ) of the node ρ is present in the authentication tree cache 102.

When the node ρ is an internal node, firstly, the AMEE 104 reads the cache line ccl(ρ) of the node ρ from the memory 103 and performs an authentication process for this cache line ccl(ρ). Specifically, the AMEE 104 verifies whether a relation tag(ρ)=Tag(sk, ρ, ccl'(ρ), ctr(ρ)) holds or not.

When the relation tag(ρ)=Tag(sk, ρ, ccl'(ρ), ctr(ρ)) holds, the AMEE 104 stores the cache line ccl(ρ) read from the memory 103 in the authentication tree cache 102. On the other hand, when the relation tag(ρ)=Tag(sk, ρ, ccl'(ρ), ctr(ρ)) does not hold, the AMEE 104 returns information indicating that the authentication has failed to the cache 100.

When the node ρ is a leaf node, firstly, the AMEE 104 reads the cache line cpt(ρ) of the ciphertext of the node ρ from the memory 103 and reads the tag tag(ρ) to be assigned to the node ρ from the memory 103 or the authentication tree cache 102. After that, the AMEE 104 performs a decryption process and an authentication process for the cache line cpt(ρ) of the ciphertext through a VeriDec(sk, ρ, cpt(ρ), ctr(ρ), tag(ρ)) process.

When the authentication is successful, the AMEE 104 generates a cache line ccl(ρ) of plaintext data and stores the generated cache line ccl(ρ) in the data cache 101, whereas when the authentication is unsuccessful, the AMEE 104 sets the counter ctr(ρ) to "bot" and returns information indicating that the authentication has failed to the cache 100.

WriteBack(ρ) Process; Process for Writing Back Cache Line from Cache to Memory Next, a WriteBack(ρ) process performed by the AMEE 104 will be described. The WriteBack(ρ) process is a process for writing back a cache line from the cache 100 to the memory 103. In the case where the node ρ is an internal node, this process can be performed when a cache line ccl(ρ) of the internal node ρ indicating a dirty state is present in the authentication tree cache 102. Further, in the case where the node ρ is a leaf node, this process can be performed when a cache line ccl(ρ) of the leaf node ρ indicating a dirty state is present in the data cache 101, and a cache line ccl(tag(ρ)) in which the tag tag(ρ) of the leaf node ρ has been stored is present in the authentication tree cache 102. However, it is necessary that the minor counter ctr_min(ρ) of the node ρ is not set to "top".

Firstly, the AMEE 104 increments the value of the minor counter ctr_min(ρ) of the node ρ by one. After that, the AMEE 104 sets the cache line ccl(par(ρ)) of the node par(ρ) stored in the authentication tree cache 102 to a dirty state.

When the node ρ is an internal node, the AMEE 104 generates a tag tag(ρ) of the node ρ through a Tag(sk, ρ, ccl'(ρ), ctr(ρ)) process. After that, the AMEE 104 replaces the tag included in the cache line ccl(ρ) of the node ρ with a new tag, and then writes back the updated cache line ccl(ρ) to the memory 103. After that, the AMEE 104 sets the cache line ccl(ρ) of the node ρ stored in the authentication tree cache 102 to a clean state.

In the case where the node ρ is a leaf node, when the cache line ccl(tag(ρ)) is not present in the authentication tree cache 102, the AMEE 104 reads the cache line ccl(tag(ρ)) in which the tag tag(ρ) of the node ρ has been stored from the memory 103. After that, the AMEE 104 performs an encryption process for the cache line ccl(ρ) of the plaintext data through an AuthEnc(sk, ρ, ccl(ρ), ctr(ρ)) process. Specifically, the AMEE 104 encrypts the cache line ccl(ρ) of the plaintext data and thereby generates a cache line cpt(ρ) of a ciphertext and a tag tag(ρ). Then, the AMEE 104 writes back the generated cache line cpt(ρ) of the ciphertext to the memory 103. After that, the AMEE 104 sets the cache line ccl(ρ) of the plaintext data of the node ρ stored in the data cache 101 to a clean state. After that, the AMEE 104 replaces the tag of the cache line ccl(tag(ρ)) stored in the authentication tree cache 102 with a new tag.

Invalidate(ρ) Process; Process for Invaliding Node ρ

Next, an Invalidate(ρ) process performed by the AMEE 104 will be described. The Invalidate(ρ) process is a process for invalidating a node ρ. This process can be performed when a cache line ccl(ρ) of the node ρ indicating a clean state is present in the data cache 101 or the authentication tree cache 102. In this case, the AMEE 104 deletes the cache line ccl(ρ) stored in the data cache 101 or the authentication tree cache 102, and thereby invalidates the cache line ccl(ρ).

CarryUp(ρ) Process; Carry-Up Process for Counter Included in ccl(ρ)

Next, a CarryUp(ρ) process performed by the AMEE 104 will be described. The CarryUp(ρ) process is a process for carrying up a counter (i.e., producing a carry of a counter) included in a cache line ccl(ρ) of the node ρ. This process can be performed when the cache line ccl(ρ) of the node ρ is present in the authentication tree cache 102.

Firstly, child nodes the minor counter of each of which has not been set to "end" among all the child nodes of the node ρ are referred to as child nodes ω. Then, when the child node ω is a leaf node or when no child node ω is present in the authentication tree cache 102, the AMEE 104 performs a Read (ω) process for the child node ω

After that, the AMEE 104 increments the value of the major counter (major counter assigned to the node ω) stored in the cache line ccl(ρ) of the node ρ by one. After that, the AMEE 104 sets the minor counter ctr_min(ω) assigned to the node ω to "bot".

After that, when the node ω is a leaf node, the AMEE 104 performs a WriteBack (ω) process for the node ω, and in all other cases, the AMEE 104 sets the cache line ccl(ω) to a dirty state.

As described above, in the information processing device 1 according to the present disclosure, when the AMEE 104 deletes any of the plurality of nodes constituting the authentication tree, it updates the value of the counter assigned to the parent node of the node to be deleted based on the value of the counter assigned to the node to be deleted. Further, when the AMEE 104 adds, to the plurality of nodes constituting the authentication tree, a new node at the position where the deleted node was originally located, it sets the value of the counter assigned to the added node based on the value of the counter assigned to the parent node of the added node. As a result, the counter value of the node to be deleted differs from the counter value of the added node, so that new authentication is required when the node is added. That is, in the information processing device 1, a situation in which a node deleted in the past is added in the authentication tree again without performing any authentication thereof never occurs. As a result, the information processing device 1 can improve the confidentiality.

Note that in the present disclosure, some or all of the processes performed by the information processing device 1 may also carried out by causing a CPU to execute a computer program.

Specifically, the above-described program includes a set of instructions (or software codes) that, when being loaded into a computer, causes the computer to perform one or more of the functions described in the example embodiments. The program may be stored in a non-transitory computer readable medium or in a physical storage medium. By way of example rather than limitation, a computer readable medium or a physical storage medium may include a RAM (Random-Access Memory, a ROM (Read-Only Memory), an SSD (Solid-State Drive), or other memory technology. Further, by way of example rather than limitation, the computer readable medium or the physical storage medium may include a CD-ROM, a DVD (Digital Versatile Disc), a Blu-ray (Registered Trademark) disk, or other optical disk storages. Further, by way of example rather than limitation, the computer readable medium or the physical storage medium may include a magnetic cassette, a magnetic tape, and a magnetic disk storage, or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Although the present disclosure is described above with reference to example embodiments, the present disclosure is not limited to the above-described example embodiments. Various modifications that can be understood by those skilled in the art can be made to the configuration and details of the present disclosure within the scope and spirit of the disclosure. Further, the example embodiments may be combined with one another as appropriate.

Each of the drawings is merely an example to illustrate one or more embodiments. Each of the drawing is not associated with only one specific embodiment, but may be associated with one or more other embodiments. As will be understood by those skilled in the art, various features or steps described with reference to any one of the drawings may be combined with features or steps shown in one or more other drawings in order to create, for example, an embodiment that is not explicitly shown in the drawings or described in the specification. Not all of the features or steps shown in any one of the drawings to describe an embodiment are necessarily indispensable, and some features or steps may be omitted. The order of steps in any of the drawings may be changed as appropriate.

Further, the whole or part of the example embodiments disclosed above can be described as, but not limited to, the following supplementary notes.

Supplementary Note 1

An information processing device comprising:

a memory;

an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes;

a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, wherein the authenticated memory encryption engine is further configured to:

update, when any of the plurality of nodes constituting the authentication tree is to be deleted, a value of a counter assigned to a parent node of the node to be deleted based on a value of a counter assigned to the node to be deleted; and set, when a new node is to be added at a position where the deleted node was originally located in the authentication tree, a value of a counter assigned to the added node based on a value of a counter assigned to a parent node of the added node.

Supplementary Note 2

The information processing device described in Supplementary note 1, wherein the authenticated memory encryption engine is further configured to:

update, when deleting any of the plurality of nodes constituting the authentication tree, the value of the counter assigned to the parent node of the node to be deleted to a value larger than a larger one of the value of the counter assigned to the parent node of the node to be deleted and the value of the counter assigned to the node to be deleted, and set, when adding a new node at a position where the deleted node was originally located in the authentication tree, the value of the counter assigned to the added node to a value equal to or larger than the value of the counter assigned to the parent node of the added node.

Supplementary Note 3

The information processing device described in Supplementary note 1, wherein the authenticated memory encryption engine is further configured to:

update, when deleting any of the plurality of nodes constituting the authentication tree, the value of the counter assigned to the parent node of the node to be deleted to a larger one of the value of the counter assigned to the parent node of the node to be deleted and the value of the counter assigned to the node to be deleted, and set, when adding a new node at a position where the deleted node was originally located in the authentication tree, the value of the counter assigned to the added node to a value larger than the value of the counter assigned to the parent node of the added node.

Supplementary Note 4

The information processing device described in Supplementary note 1, wherein a counter assigned to each node in the authentication tree is formed of a major counter of which a value is represented by, among a plurality of bits representing a value of the counter, a high-order bit, and a minor counter of which a value is represented by a low-order bit, and the major counter is shared by a plurality of nodes having a common parent node.

Supplementary Note 5

The information processing device described in Supplementary note 4, wherein the authenticated memory encryption engine is further configured to:

update, when deleting any of the plurality of nodes constituting the authentication tree, a value of a major counter assigned to the parent node of the node to be deleted to a value larger than a larger one of the value of the major counter assigned to the parent node of the node to be deleted and a value of a major counter assigned to the node to be deleted, and set, when adding a new node at a position where the deleted node was originally located in the authentication tree, a value of a major counter assigned to the added node to a value equal to or larger than the value of the major counter assigned to the parent node of the added node.

Supplementary Note 6

The information processing device described in Supplementary note 5, wherein when the authenticated memory encryption engine has updated a value of the major counter shared by the plurality of nodes having a common parent node, the authenticated memory encryption engine initializes values of respective minor counters of the plurality of nodes having the common parent node.

Supplementary Note 7

A method for controlling an information processing device, the information processing device comprising:

a memory;

an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes;

a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, the method comprising:

updating, when any of the plurality of nodes constituting the authentication tree is to be deleted, a value of a counter assigned to a parent node of the node to be deleted based on a value of a counter assigned to the node to be deleted; and setting, when a new node is to be added at a position where the deleted node was originally located in the authentication tree, a value of a counter assigned to the added node based on a value of a counter assigned to a parent node of the added node.

Supplementary Note 8

The method for controlling an information processing device described in Supplementary note 7, wherein when any of the plurality of nodes constituting the authentication tree is deleted, the value of the counter assigned to the parent node of the node to be deleted is updated to a value larger than a larger one of the value of the counter assigned to the parent node of the node to be deleted and the value of the counter assigned to the node to be deleted, and when a new node is added at a position where the deleted node was originally located in the authentication tree, the value of the counter assigned to the added node is updated to a value equal to or larger than the value of the counter assigned to the parent node of the added node.

Supplementary Note 9

A control program for causing a computer to perform a process for controlling an information processing device, the information processing device comprising:

a memory;

an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes;

a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, the control program being configured to further cause the computer to perform:

a process for updating, when any of the plurality of nodes constituting the authentication tree is to be deleted, a value of a counter assigned to a parent node of the node to be deleted based on a value of a counter assigned to the node to be deleted; and a process for setting, when a new node is to be added at a position where the deleted node was originally located in the authentication tree, a value of a counter assigned to the added node based on a value of a counter assigned to a parent node of the added node.

Supplementary Note 10

The control program described in Supplementary note 9, wherein the control program is further configured to cause the computer to perform:

a process for updating, when deleting any of the plurality of nodes constituting the authentication tree, the value of the counter assigned to the parent node of the node to be deleted to a value larger than a larger one of the value of the counter assigned to the parent node of the node to be deleted and the value of the counter assigned to the node to be deleted, and a process for setting, when adding a new node at a position where the deleted node was originally located in the authentication tree, the value of the counter assigned to the added node to a value equal to or larger than the value of the counter assigned to the parent node of the added node.

Some or all of the elements (e.g., structures and functions) described in Supplementary notes 2 to 6 that are dependent on Supplementary note 1 can be dependent on Supplementary notes 7 and 9 by the same dependency relationships as those in Supplementary notes 2 to 6.

Some or all of the elements described in any of the supplementary notes can be applied to various types of hardware, software, recording means for recording software, systems, and methods.

The present disclosure can provide an information processing device, a method for controlling an information processing device, and a control program capable of improving confidentiality.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. An information processing device comprising:

a memory;

an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes;

a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, wherein the authenticated memory encryption engine is further configured to:

update, when any of the plurality of nodes constituting the authentication tree is to be deleted, a value of a counter assigned to a parent node of the node to be deleted based on a value of a counter assigned to the node to be deleted; and set, when a new node is to be added at a position where the deleted node was originally located in the authentication tree, a value of a counter assigned to the added node to a value different from the value of the counter assigned to the node to be deleted based on a value of a counter assigned to a parent node of the added node.

2. The information processing device according to claim 1, wherein the authenticated memory encryption engine is further configured to:

update, when deleting any of the plurality of nodes constituting the authentication tree, the value of the counter assigned to the parent node of the node to be deleted to a value larger than a larger one of the value of the counter assigned to the parent node of the node to be deleted and the value of the counter assigned to the node to be deleted, and set, when adding a new node at a position where the deleted node was originally located in the authentication tree, the value of the counter assigned to the added node to a value equal to or larger than the value of the counter assigned to the parent node of the added node.

3. The information processing device according to claim 1, wherein the authenticated memory encryption engine is further configured to:

update, when deleting any of the plurality of nodes constituting the authentication tree, the value of the counter assigned to the parent node of the node to be deleted to a larger one of the value of the counter assigned to the parent node of the node to be deleted and the value of the counter assigned to the node to be deleted, and set, when adding a new node at a position where the deleted node was originally located in the authentication tree, the value of the counter assigned to the added node to a value larger than the value of the counter assigned to the parent node of the added node.

4. The information processing device according to claim 1, wherein a counter assigned to each node in the authentication tree is formed of a major counter of which a value is represented by, among a plurality of bits representing a value of the counter, a high-order bit, and a minor counter of which a value is represented by a low-order bit, and the major counter is shared by a plurality of nodes having a common parent node.

5. The information processing device according to claim 4, wherein the authenticated memory encryption engine is further configured to:

update, when deleting any of the plurality of nodes constituting the authentication tree, a value of a major counter assigned to the parent node of the node to be deleted to a value larger than a larger one of the value of the major counter assigned to the parent node of the node to be deleted and a value of a major counter assigned to the node to be deleted, and set, when adding a new node at a position where the deleted node was originally located in the authentication tree, a value of a major counter assigned to the added node to a value equal to or larger than the value of the major counter assigned to the parent node of the added node.

6. The information processing device according to claim 5, wherein when the authenticated memory encryption engine has updated a value of the major counter shared by the plurality of nodes having a common parent node, the authenticated memory encryption engine initializes values of respective minor counters of the plurality of nodes having the common parent node.

7. A method for controlling an information processing device, the information processing device comprising:

a memory;

an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes;

a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, the method comprising:

updating, when any of the plurality of nodes constituting the authentication tree is to be deleted, a value of a counter assigned to a parent node of the node to be deleted based on a value of a counter assigned to the node to be deleted; and setting, when a new node is to be added at a position where the deleted node was originally located in the authentication tree, a value of a counter assigned to the added node to a value different from the value of the counter assigned to the node to be deleted based on a value of a counter assigned to a parent node of the added node.

8. The method for controlling an information processing device according to claim 7, wherein when any of the plurality of nodes constituting the authentication tree is deleted, the value of the counter assigned to the parent node of the node to be deleted is updated to a value larger than a larger one of the value of the counter assigned to the parent node of the node to be deleted and the value of the counter assigned to the node to be deleted, and when a new node is added at a position where the deleted node was originally located in the authentication tree, the value of the counter assigned to the added node is updated to a value equal to or larger than the value of the counter assigned to the parent node of the added node.

9. A non-transitory computer readable medium storing a control program for causing a computer to perform a process for controlling an information processing device, the information processing device comprising:

a memory;

an authentication tree cache in which some of counters, identifiers, and tags generated by using the counters and the identifiers, are temporarily stored, the counters and the identifiers being included in an authentication tree including a plurality of nodes connected with one another in a tree shape in which a pair of a counter and an identifier is assigned to each of the nodes;

a data cache in which some of a plurality of data respectively assigned to a plurality of leaf nodes are temporarily stored, the plurality of leaf nodes being nodes located in a lowest layer among the plurality of nodes constituting the authentication tree; and an authenticated memory encryption engine configured to perform a cryptographic process and an authentication process using the authentication tree for data to be exchanged between the data cache and the memory, and perform an authentication process for at least one tag respectively generated at at least one node present on a path from a leaf node to which the data is assigned to a root node, the control program being configured to further cause the computer to perform:

a process for updating, when any of the plurality of nodes constituting the authentication tree is to be deleted, a value of a counter assigned to a parent node of the node to be deleted based on a value of a counter assigned to the node to be deleted; and a process for setting, when a new node is to be added at a position where the deleted node was originally located in the authentication tree, a value of a counter assigned to the added node to a value different from the value of the counter assigned to the node to be deleted based on a value of a counter assigned to a parent node of the added node.

10. The non-transitory computer readable medium storing the control program according to claim 9, wherein the control program is further configured to cause the computer to perform:

a process for updating, when deleting any of the plurality of nodes constituting the authentication tree, the value of the counter assigned to the parent node of the node to be deleted to a value larger than a larger one of the value of the counter assigned to the parent node of the node to be deleted and the value of the counter assigned to the node to be deleted, and a process for setting, when adding a new node at a position where the deleted node was originally located in the authentication tree, the value of the counter assigned to the added node to a value equal to or larger than the value of the counter assigned to the parent node of the added node.

* * * * *